United States Patent

[11] 3,624,315

[72] Inventors Max E. Broce
Route 2, McKinney, Tex. 75069;
Derek Colman, 14020 Maham Road, Apt. 138, Dallas, Tex. 75240; Jack P. Mize, 918 Beechwood, Richardson, Tex. 75080

[21] Appl. No. 862,106
[22] Filed July 15, 1969
[45] Patented Nov. 30, 1971
Original application Jan. 23, 1967, Ser. No. 610,991, now abandoned. Divided and this application July 15, 1969, Ser. No. 862,106

[54] TRANSDUCER APPARATUS AND TRANSDUCER AMPLIFIER SYSTEM UTILIZING INSULATED GATE SEMICONDUCTOR FIELD EFFECT DEVICES
11 Claims, 15 Drawing Figs.

[52] U.S. Cl. ..... 179/100.4 A, 179/110 B, 179/1 A
[51] Int. Cl. ..... G11b 3/00, H04r 23/00, H04m 1/60
[50] Field of Search ..... 179/100.4 A, 100.4 ST, 1 A, 1.3, 110 B; 307/279, 303, 304; 330/1, 24, 29, 38; 317/235 (26)

[56] References Cited

UNITED STATES PATENTS

| | | | |
|---|---|---|---|
| 3,144,522 | 8/1964 | Bernstein | 179/100.41 |
| 3,239,611 | 3/1966 | Zerbst | 179/100.41 X |
| 3,377,528 | 4/1968 | Toussaint et al. | 317/235 |
| 3,319,140 | 5/1967 | Toussaint et al. | 179/110 X |
| 3,445,596 | 5/1969 | Drake | 179/1 |
| 3,448,397 | 6/1969 | Lin et al. | 330/38 |

FOREIGN PATENTS

| | | | |
|---|---|---|---|
| 941,657 | 11/1963 | Great Britain | 179/1 |

OTHER REFERENCES

Wolff, " New Field Effect Device May Aid Integrated Circuit Design," Electronics Nov. 1963, No. 48, Page 44

*Primary Examiner*—Terrell W. Fears
*Assistant Examiner*—Raymond F. Cardillo, Jr.
*Attorneys*—Samuel M. Mims, Jr., James O. Dixon, Andrew M. Hassell, Harold Levine, Jack A. Kanz, Kenneth R. Glaser, Henry K. Woodward and Robert J. Crawford

ABSTRACT: A transducer apparatus wherein the source to drain conductance of an insulated gate semiconductor field effect device is modulated by the application of mechanical stress to the channel layer of the device. Specific transducer modifications include microphone pickups and phonopickups. The pickup may include preamplifiers in either discrete or integrated circuit form.

INVENTORS
MAX E. BROCE
DEREK COLMAN
JACK P. MIZE
BY
ATTORNEY

TRANSDUCER APPARATUS AND TRANSDUCER AMPLIFIER SYSTEM UTILIZING INSULATED GATE SEMICONDUCTOR FIELD EFFECT DEVICES

This application is a division of application, Ser. No. 610,991, filed Jan. 23, 1967, abandoned in favor of a continuation application, Ser. No. 014,744, filed Feb. 24, 1970.

This invention relates to insulated gate semiconductor field effect devices, and more particularly relates to the stress induced modulation of the carrier mobility of the channel layer of such devices.

Insulated gate field effect devices have been known in the art for many years, the most outstanding example of which is a metal oxide semiconductor field effect transistor, commonly referred to as a MOSFET device, as described in the article, "-Metal Oxide Semiconductor Field Effect Transistors", by Frederick P. Heiman and Stephen R. Hofstein, Electronics, Nov. 30, 1964, pages 50 through 61.

In an insulated gate field effect device, a channel layer only a few hundred angstroms thick exists between the source and drain areas of the device. The carrier mobility in the channel layer (surface mobility) is modulated by a control voltage applied to the gate electrode, which electrode is separated from the channel layer by an oxide or other insulating layer. Applicants have discovered that when a device is formed on a piezoresistive substrate such as silicon, the channel layer of the device exhibits a piezoresistive effect and the mobility of the channel layer can be modulated by mechanical stresses applied to the device. Stress induced variations of the surface mobility as high as plus or minus 10 percent in P-channel enhancement mode devices have been observed. Since the device parameters are a function of carrier mobility, any change of mobility produces a corresponding change in device properties such as conductance and transconductance. Such devices therefore function as a transducer wherein an electrical signal may be modulated in response to a mechanical force, the transducer responding linearly to stress in the frequency range from DC to an upper frequency limit determined by the mass and mechanical structure of the device. Since the transducer device is a three terminal device and can exhibit gain, it will function as an "active" transducer when subjected to stress as contemplated herein. The active feature permits the isolated coupling and mixing of an electrical signal (through the gate region of the three terminal transducer) with signals generated by stress on the device. The active feature of the device also permits coupling of the stress induced electrical signal to the gate of the device by means of positive feedback of the signal, thereby enhancing the output signal voltage or power. Further, since the devices are fabricated on silicon or germanium, for example, the transducer devices may be incorporated into integrated circuit technology. These and other features contribute to making the device unique as a transducer element. Specific embodiments of the invention as a transducer element. Specific embodiments of the invention as a transducer element are described in detail hereinafter. It should also be noted that in depletion mode devices, the device will function as a two terminal passive transducer.

It is an object of this invention to provide a unique transducer device.

It is a further object of this invention to provide a device which permits the isolated coupling and mixing of an electrical signal with signals generated by stresses on the device itself. It is an additional object of the invention to provide a novel method of varying the mobility of the channel layer of an insulated gate field effect type device.

A further object of the invention is to provide integrated circuit pickup amplifier arrangements wherein the transducer of the arrangement is an active device.

Additional objects and features of the invention will become apparent as the description proceeds.

The phenomena to which the discovery relates will now be referred to in more detail and examples of transducer devices utilizing the phenomena of the invention will be described with reference to the accompanying drawings in which.

Figure 9:
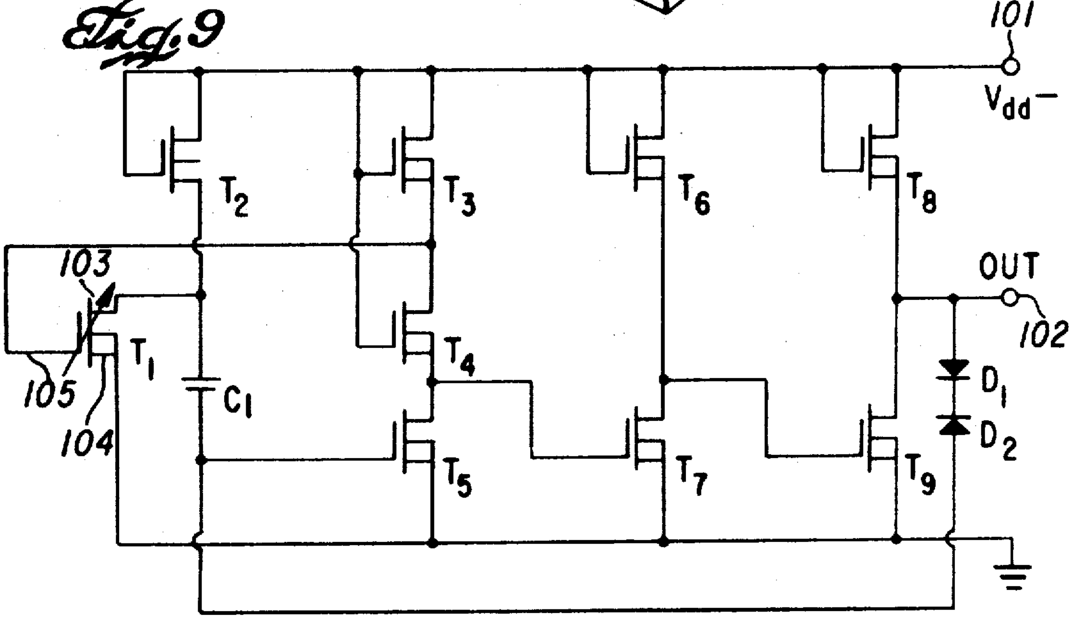
FIG. 9 is a schematic representation of the integrated circuit of FIG. 8.
Figures 10, 11A, 11B:
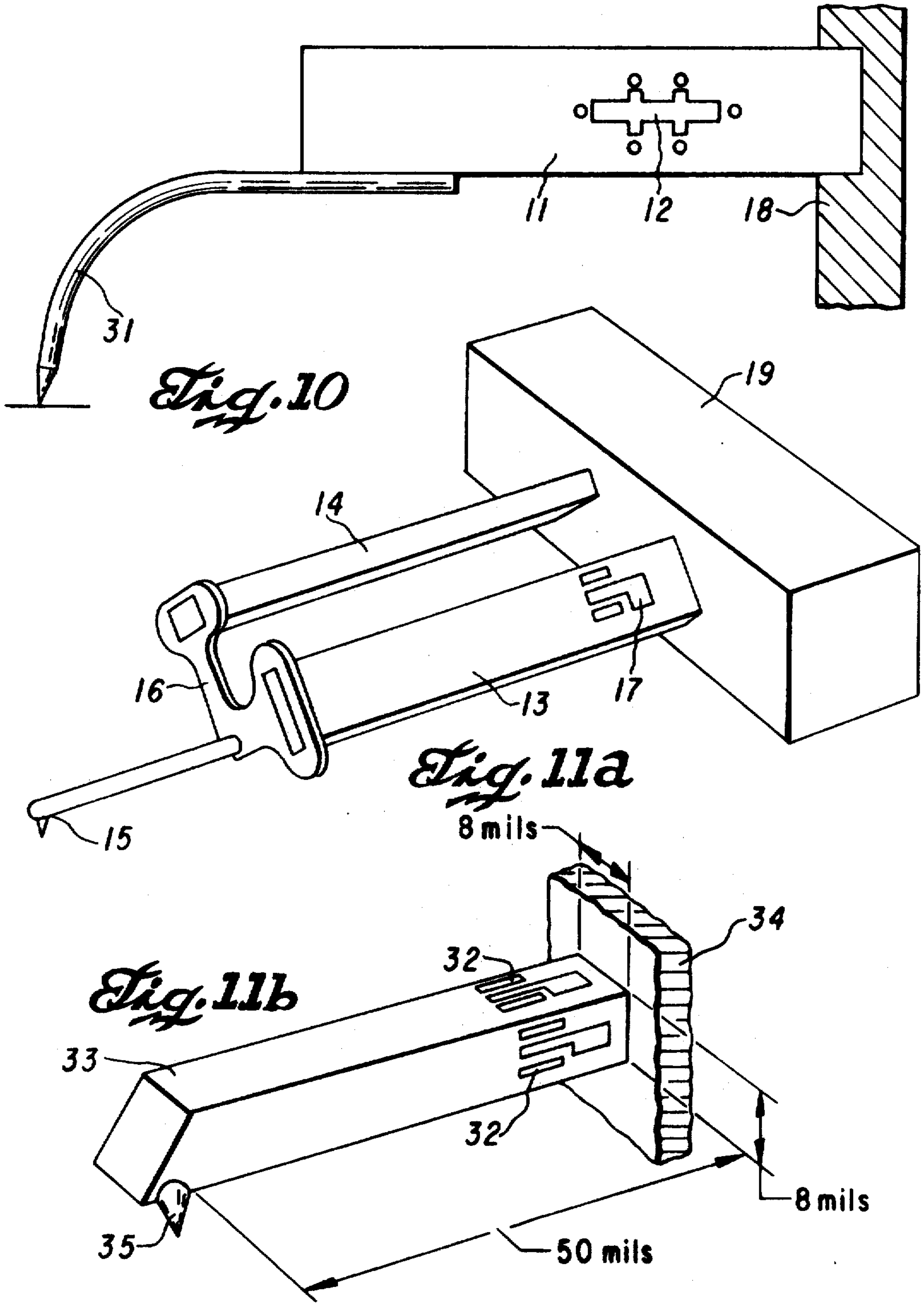
FIG. 10 is a simplified illustration of a phono-pickup transducer in accordance with this invention.
Figure 12:
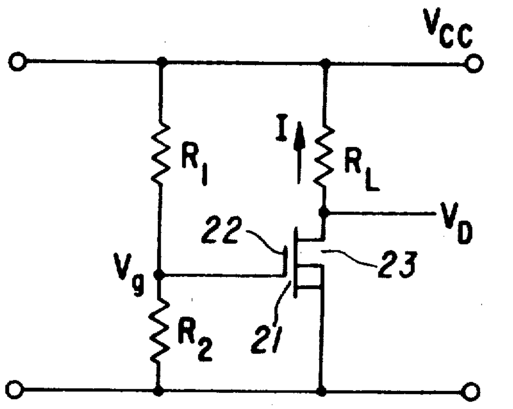
Figure 14:
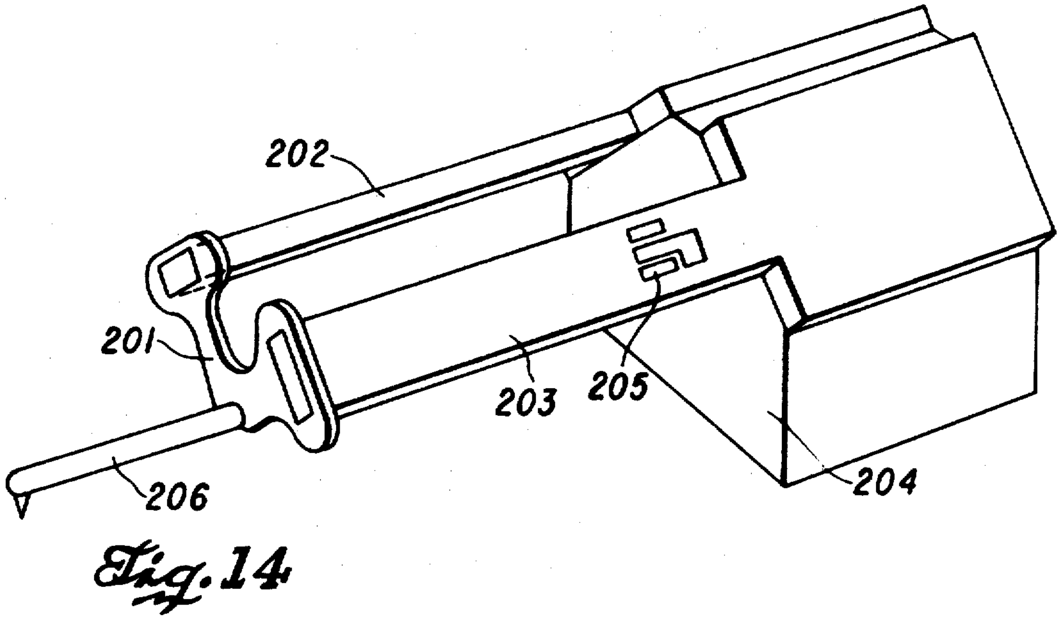
Figure 13:
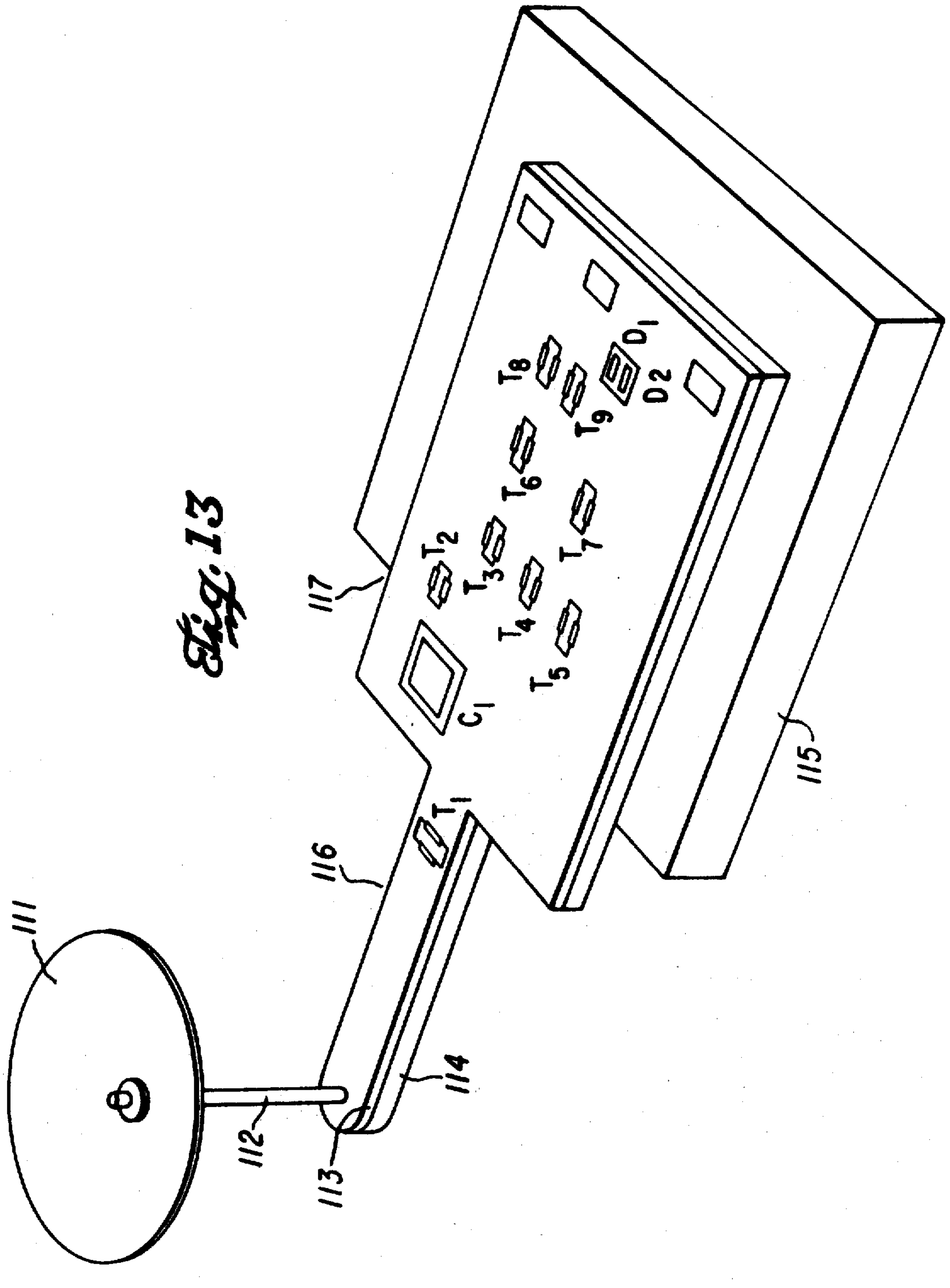

FIG. 11*a* is a simplified representation of one embodiment of a stereo cartridge transducer;

FIG. 11*b* illustrates an additional embodiment of a transducer stereo cartridge;

FIG. 12 is a schematic of a basic amplifier circuit utilizing the transducer as an active device;

FIG. 13 is a plan view of a modification of the Transducer-Amplifier of FIG. 9;

FIG. 14 is a plan view of an integrated amplifier transducer stereo-phonograph system.

There are two modes of operation for insulated field effect devices, these modes of operation being described in detail with respect to transistors in the above referenced Nov. 30, 1964, article in Electronics. As pointed out in the Electronics article, in the depletion mode, charge carriers are present in the channel layer with zero gate bias and a reverse bias (negative gate potential for electron conduction units) depletes this charge, reducing the channel conductance. In the enhancement mode, the gate is forward biased (positive gate potential for electron conduction units); this enhances the channel charge and increases the channel conductance. Transistors which exhibit significant channel conductance at zero gate bias are called depletion-type transistor devices; transistors that show no channel conductance at zero bias are referred to as enhancement-type transistor devices. In the case of a depletion type device with no applied gate bias, the device will function as a two terminal passive device. Since either electron type conduction (N-type) or hole type conduction (P-type) devices may be made, four types of insulated gate semiconductor field effect devices are obtainable. The following discussion is based on P-type inversion layer devices but also applies to N-type devices if all polarities are reversed.

Figures 1, 2:
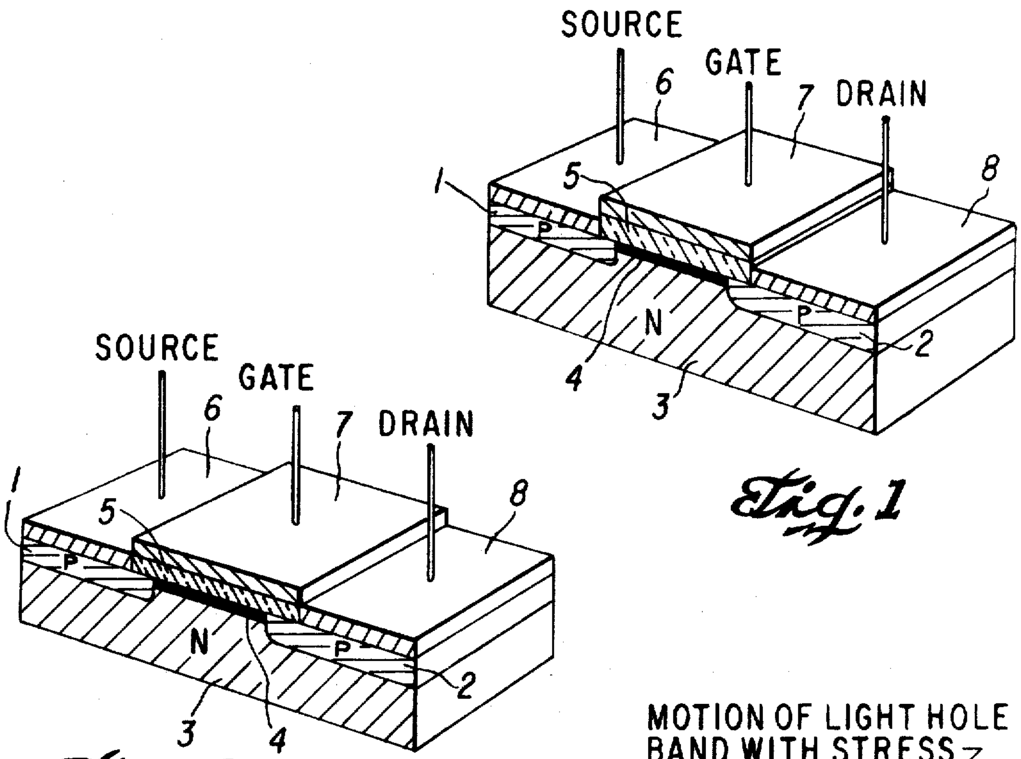
FIG. 1 is a cross-sectional and partial plan view of an enhancement mode insulated gate semiconductor field effect device.
FIG. 2 is a cross-sectional and partial plan view of a depletion mode insulated gate semiconductor field effect device.

Illustrated in FIG. 1 is a P-channel enhancement mode insulated gate semiconductor field effect device. The device consists of two heavily doped P-type areas 1 and 2 which are diffused into the N-type silicon substrate 3. Diffused areas 1 and 2 are referred to as the source and drain respectively and are located in close proximity to each other and are connected by a channel layer 4. A thin insulating layer 5 such as silicon oxide is placed over the surface of the silicon between the source and drain, which oxide forms the gate dielectric material. Other dielectrics, such as silicon nitride, may be used if desired. Metal electrodes are shown at 6, 7 and 8 for the source, gate and drain, respectively. The source terminal is the reference terminal, the gate terminal is the control electrode while the drain is the output of the device. These three leads are analogous to the bipolar transistor emitter, base and collector, respectively.

With the drain and source grounded, the gate bias controls the charge in the channel layer 4. A negative bias applied to the gate modifies conditions in the silicon substrate so that the gate accumulates a negative charge and the electrons that are present in the N-type silicon are repelled, forming a depletion region. Once sufficient depletion has occurred, additional gate bias attracts positive mobile holes to the surface. When enough holes have accumulated in the channel area, the surface of the silicon changes from electron dominated to hole dominated material and is said to have inverted. Thus, the situation now exists where the two P diffused regions are connected together by a P-type inversion layer or channel from whence the nomenclature P-channel device originates. A signal on the gate can modulate the number of carriers within the channel regions so that the gate in effect controls current flowing in the channel.

In FIG. 2, a conventional P-channel depletion mode insulated gate semiconductor field effect device is illustrated with the same reference numerals as applied in FIG. 1. In the P-channel depletion type transistor, the highly doped P-type regions 1 and 2 are diffused into a N-type substrate. The channel layer 4 in this type device has sufficient hole carriers that current will flow between the source and drain with zero gate bias. A negative voltage applied to the gate increases the number of hole carriers in the channel layer 4 and thereby increases the conductance of such channel layer, whereas a positive gate voltage will decrease the hole carriers present in channel layer 4 and decrease the conductance thereof. The channel layer in a depletion mode operation such as the channel 4 is sometimes referred to as an accumulation layer.

While FIGS. 1 and 2 have been described with respect to P-channel field effect transistors, it is obvious that N-channel devices may be fabricated by diffusing N-type regions into a P-type substrate in accordance with well known techniques.

In the course of investigation and measurement by applicants of carrier mobility in silicon surface channel layers of devices as described above, it was found that surface mobility values were extremely sensitive to and dependent on stress imparted to the experimental sample. Since electrical conduction in an insulated gate semiconductor field effect device takes place in a channel layer on the surface of the device, which channel layer is in the order of a few hundred angstroms thick, very small deflections on the device were found to have a marked affect on the mobility of carriers in the thin channel layers. This unusual characteristic of the device has been determined to be a piezoresistive effect, and both the two and three terminal devices of this invention may be referred to as insulated gate piezoresistive semiconductor field effect devices. "Channel layer" as used in relation to a two terminal device is used in the same sense as when used with respect to prior art MOSFET devices, i.e., it is an extremely thin (a few hundred angstroms) layer located between source and drain areas in a semiconductor substrate.

The phenomenon of the piezoresistive effect exhibited by the channel layer of these devices is explained as follows.

Figure 3:
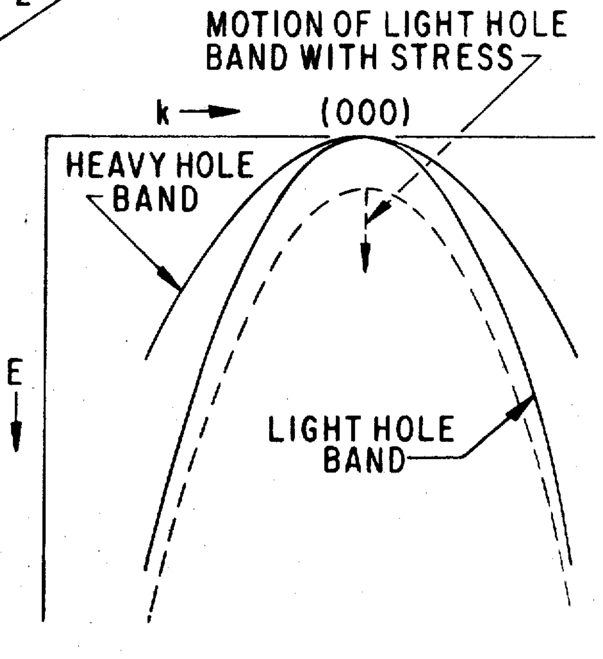
FIG. 3 is a graphical representation of valence band movement in P-type silicon as a function of stress.

In order to properly treat hole conductivity mobility in silicon P-type inversion layers, it is important to take into account the degeneracy of the valence band at K=0, K being defined as the wave vector, which gives rise to two holes of different effective mass. See R. A. Smith Semiconductors, Cambridge University Press, London (1959). The two types of holes (light and heavy) have effective masses that differ by approximately a factor of 3. See E. H. Putley, Hall Effect and Related Phenomena, Butterworths, London (1960). In the inversion layer both types of hole contribute to the transport process, and in the unstressed inversion layer it is assumed that the heavy and light holes are in the same ratio as they are in the bulk. In the presence of a stress field, the degeneracy of the valence band is lifted and the light and heavy hole bands separate. Thus upon application of a uniaxial stress, the light and heavy hole bands move apart causing a change in population of the light hole band. We therefore assume in the following analysis that the change in mobility of carriers in a stressed inversion layer is caused by valence band splitting which changes the population ratio of light to heavy holes in the inversion layer. A representation of valence band movement in P-type silicon as a function of stress is shown in FIG. 3 where Energy, E, is plotted versus wave vector, K. In N-type inversion layers the mechanism of mobility variation is due to the removal of the six-fold degeneracy of the multivalley conduction band.

A quantitative calculation of inversion layer hole mobility as a function of stress will now be given based on the foregoing consideration. The results of the quantitative calculation will then be compared with experimental values. The concentration of holes ($p$) in a given band is:

$$P=\int_0^\infty (D)\cdot(f)\,dE \qquad \text{Eq. II.1}$$

where $D$ is the density of states in the band and $f$ is the probability of occupation of a given state $$f=\frac{1}{1+\exp.\left(\frac{E-E_F}{kT}\right)} \qquad \text{Eq. II.2}$$

In the foregoing equations, $E$ is the energy, $E_F$ is the Fermi level energy and $T$ is the temperature. For a parabolic band (a reasonable approximation in this case)

$$D=8\sqrt{\frac{2\pi}{h^3}}\,m_i^{*3/2}E^{1/2} \qquad \text{Eq. II.3}$$

where $m_i^*$ is the effective mass of a hole moving in a valence band $v_i$ ($i$=1 or $h$ corresponding to the light and heavy hole bands). For two degenerate bands the ratio of the concentration of holes in the heavy and light bands $P_h/P_l$ is given by:

$$\frac{P_h}{P_l}=\frac{\int_0^\infty (D_h)(f)\,dE}{\int_0^\infty (D_l)(f)\,dE}=\left(\frac{m_h^*}{m_l^*}\right)^{3/2} \qquad \text{Eq. II.4}$$

Application of uniaxial stress changes the energy band structure and removes the valence band degeneracy at $K=0$. The splitting of the valence bands ($\Delta$E) has been calculated as:

$$E=\tau 7\times10^{-12}\text{ ev.} \qquad \text{Eq. II.5}$$

where $\tau$ dynes/cm.$^2$ is the stress. This equation varies slightly with crystallographic direction and we have taken the mean value. For a stress of $4\times10^8$ dynes/cm.$^2$ (a typical stress encountered in actual devices) we obtain a splitting of $2.8\times10^{-3}$ ev.

From equations 1, 2 and 4 the concentration of holes in the light hole band is now given by:

$$P_l=\int_0^\infty \frac{8\times2^{1/2}\pi m_l^{*3/2}(E-2.8\times10^{-3})^{1/2}}{h^3\left[1+\exp.\left(\frac{E-E_F}{kT}\right)\right]}\,dE \qquad \text{Eq. II.6}$$

and also $$P_h=\int_0^\infty \frac{8\times2^{1/2}\pi m_h^{*3/2}(E)^{1/2}}{h^3\left[1+\exp.\left(\frac{E-E_F}{kT}\right)\right]}\,dE \qquad \text{Eq. II.7}$$

There is experimental evidence that the inversion layers for the device under discussion are degenerate with a very high concentration of holes. There will therefore be very little error introduced by assuming that the Fermi level lies at the valence band edge i.e., $E_F$=0. Evaluating eq. 6 and 7 we find that:

$$\frac{P_h}{P_l}=\left(\frac{m_h^*}{m_l^*}\right)^{3/2}\frac{8}{7.25} \qquad \text{Eq. II.8}$$

The conductivity $\sigma$ is given by $$\sigma=Pg\mu \qquad \text{Eq. II.9}$$

where $\mu$ is the effective mobility of both heavy and light holes $\sigma = P_h g \mu_h + P_l g \mu_l$ Eq. II.10 $P = P_h + P_l$ Eq. II.11 therefore $$\mu = \frac{P_h \mu_h + P_l \mu_l}{P_h + P_l} \quad \text{Eq. II.12}$$

Assuming the lifetime of both heavy and light holes are identical $$\frac{\mu_h}{\mu_l} = \frac{m_l^*}{m_h^*} \quad \text{Eq. II.13}$$

Taking $m_l^* = 0.16\, m_e$ $m_h^* = 0.49\, m_e$ where $m_e$ is the mass of an electron in free space and taking $\mu = 180$ cm.$^2$/volt second as a typical effective hole mobility in a P-type inversion layer, from eq. 4, 12 and 13 we find:

$\mu_h = 136$ cm.$^2$/volt second $\mu_l = 417$ cm.$^2$/volt second

When the crystal is stressed at $4\times10^8$ dynes/cm.$^2$, from eq. 8, 12 and the calculated values of $\mu_h$ and $\mu_l$ we find:

$\mu = 176.5$ cm.$^2$/volt second

Thus a 2 percent change of effective mobility is produced by a stress of $4\times10^8$ dynes/cm.$^2$. This value should be compared with an experimentally measured mobility change of 1 percent due to the same stress. This calculation neglects the presence of a third hole band which is not degenerate with the other two but which is nevertheless sufficiently close to have an appreciable hole concentration at room temperature. This third band will modify the above estimate but it is not known by how much as no information is as yet available as to how this band moves with stress.

Figure 4:
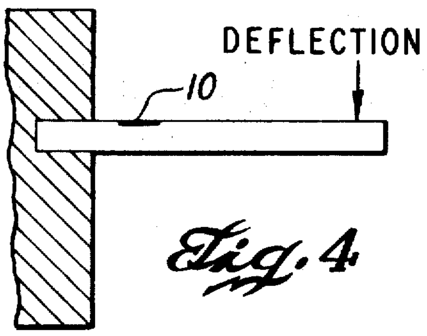
FIG. 4 is a schematic diagram illustration of the transducer device of this invention.
Figure 5:
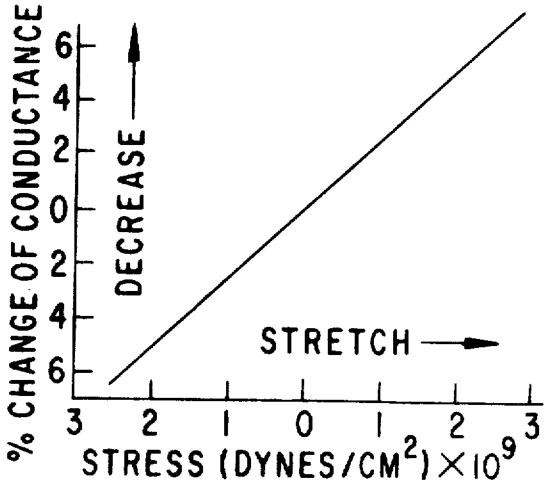
FIG. 5 is a plot of the stress applied to the device of FIG. 4 versus the change of conductance in the channel layer of the device.

FIG. 4 is a schematic diagram indicating a common cantilever by which stress may be applied to the channel layer of a metal-insulator-piezoresistive semiconductor field effect device 10. It should be understood that other mechanical means may be used to apply stress to the channel layer. FIG. 5 is a plot of the stress applied to the channel layer of the device versus the change in conductance of the channel layer of the device. It is seen that the stress produces a linear change of conductance.

Figure 6:
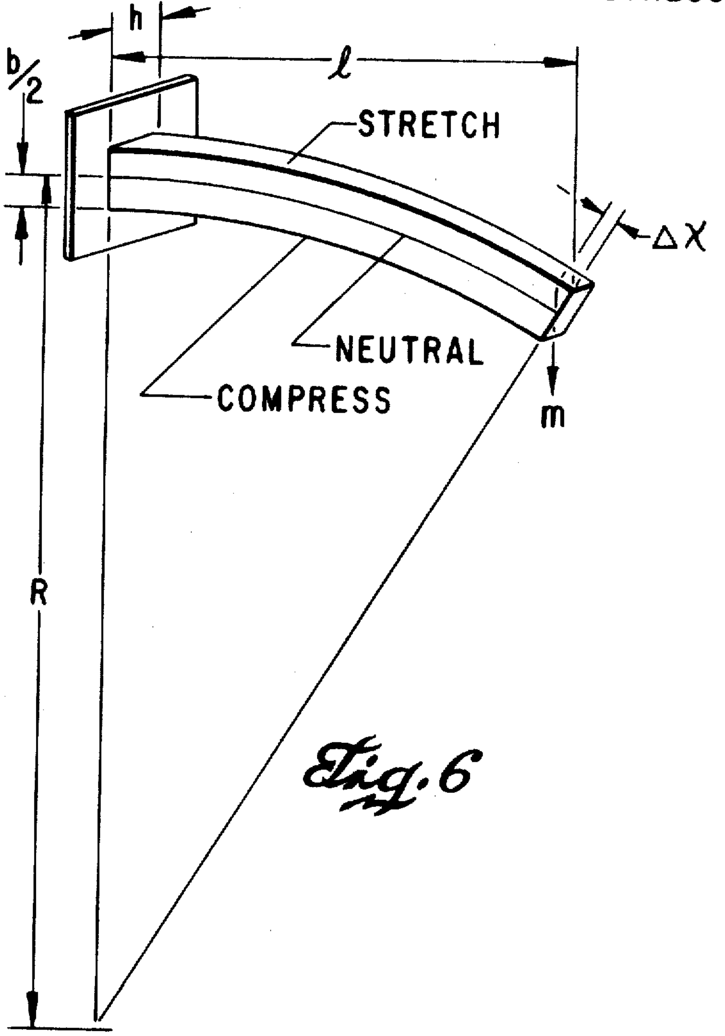
FIG. 6 is a schematic representation of the forces existing in a cantilevered silicon bar which is deflected.

If a beam of silicon is clamped at one end and caused to vibrate at the other end in the cantilever configuration as shown in FIG. 6, the upper surface of the beam will be alternately compressed and stretched. The deflection P of a cantilever under a load $m$ is given by:

$$P = 4mgl^3/Yhb^3 \quad \text{Eq. III.1}$$

where $Y$ is Young's modulus. If one assumes that the curvature is the same along the length of the beam, the strain $\Delta x/l$ is:

$$\Delta x/l = b/2R \quad \text{Eq. III.2}$$

the stress $S$ is therefore:

$$S = Yb/2R \quad \text{Eq. III.3}$$

By geometrical considerations:

$$R^2 = (l/2)^2 + (R - p/4)^2 \quad \text{eq. III.4}$$

If a microphone diaphragm is attached to the end of the cantilever, vibrations in the air will cause the diaphragm and hence the cantilever to vibrate in sympathy. The dimensions of the system must be so designed that the maximum allowable stress in silicon ($\approx 2\times10^{10}$ dynes/cm.$^2$) must not be exceeded by any sound which the microphone might encounter. Taking the maximum sound level as the threshold of pain (120 db.) and designing the system so that this produces $2\times10^{10}$ dynes/cm.$^2$ on the top surface of the cantilever we find that normal speech levels (60 db.) produce a stress of $2\times10^7$ dynes/cm.$^2$ which corresponds to a conductance change of 0.05 percent.

The average speech level which we are considering produces an air pressure modulation of 10 dynes/cm.$^2$ and a vibration amplitude of 0.1 $\mu$m. in the midfrequency range. A diaphragm with an area of 10 cm.$^2$ is therefore loaded by 100 dynes, and for maximum power transfer from air to microphone this load should produce a deflection of 0.1 $\mu$m. The compliance of the cantilever should therefore be $10^{-7}$ cm./dyne. Using eq. III.1 we have:

$$\frac{10^{-7}\text{cm.}}{\text{dyne}} = \frac{4l^3}{2\times10^{12}\frac{\text{dynes}}{\text{cm.}^2}(hb^3)} \quad \text{Eq. III.5}$$

Using eq. III.3 we have:

$$2\times10^7\frac{\text{dynes}}{\text{cm.}^2} = \frac{2\times10^{12}\text{ dynes/cm.}^2\ (b)}{2R} \quad \text{Eq. III.6}$$

Using eq. III.4 we have:

$$R^2 = \left(\frac{l}{2}\right)^2 + \left(R - \frac{10^{-5}}{4}\text{cm.}\right)^2 \quad \text{Eq. III.7}$$

We have three equations with four unknowns. If we apply a further constraint that: $l = 5h$ thus giving the cantilever reasonable proportions, we have four equations which can be solved giving:

$l = 10^{-1}$ cm.

$b = 10^{-2}$ cm.

$h = 2\times10^{-2}$ cm.

These dimensions give the maximum sensitivity in the midfrequency range and fidelity has not been considered. The mass of the diaphragm should be as low as possible as the power required to accelerate and decelerate this mass is substracted from the power available to bend the beam. This becomes important at high frequencies.

At low frequencies an air pressure modulation of 10 dynes/cm.$^2$ produces much more than 0.1 $\mu$m. amplitude therefore the optimum cantilever compliance should be greater than $10^{-7}$ cm./dyne. Conversely high frequencies require a smaller compliance for maximum power coupling to the air. Thus the sensitivity (voltage output per unit sound energy) of the microphone as designed will have a maximum response at midfrequencies and the response will fall off at 3 db./octave at the high- and low-frequency end of the spectrum. An amplifier used in conjunction with the microphone would therefore have to provide both treble and bass boost.

As the bending of the cantilever causes modulation of device conductance it is necessary to supply the device with a constant or approximately constant current. Variations of device conductance thus lead to variations in the voltage across the device and this constitutes the output signal. The impedance of the device (reciprocal source-drain conductance) can be varied over a very wide range by varying gate potential. The signal output power depends on the impedance and the current flowing through the device. The power output is limited only by the maximum DC power which may be dissipated in the device.

Fabrication of the transducer device is compatible with MOS integrated circuit techniques. When devices are referred to herein as in integrated form, it is meant that all of the semiconductor devices are formed in a single semiconductor substrate. Consequently, a complete MOSFET amplifier can be mounted along with the transducer device in the pickup head with wires coming out directly to the loudspeakers. The transducer device in this instance is preferably a metal oxide piezoresistive semiconductor field effect device. The output power would be limited by the power which could be dissipated in a pickup arm. A 3-watt output in this application is feasible using a class B output stage.

A basic amplifier circuit incorporating the metal insulator-piezoresistive semiconductor transducer field effect transistor is shown in FIG. 12. The gate voltage, $v_g$, applied to gate 22 of the device 21, is taken from the midpoint of a voltage divider formed by resistors $R_1$ and $R_2$ and is held constant by a potential divider between ground and the battery potential $v_{cc}$. Current (I) flows through the load resistor ($R_L$) and through the device setting up a drain potential $v_D$ at the junction of drain 23 and load resistor ($R_L$). Stressing the channel layer of the device 21 by conventional means, such as the cantilever arrangement of FIG. 4, changes the source-drain conductance $g_{SD}$ (triode region) and hence modifies $V_D$. Following is an analysis of the output signal $v_D$.

$$I = \frac{v_{cc} - v_D}{RL} = v_D g_{SD} \quad \text{Eq. v.1}$$

hence $$v_{cc}-v_D=R_L v_D g_{SD} \qquad \text{Eq. } v.2$$

$$g_{SD}=\beta(v_g'-v_D) \qquad \text{Eq. } v.3$$

where $$v_g'=v_g-v_T$$

$v_T$=threshold gate voltage $$\beta=\mu\frac{\epsilon_0 w}{t_{ox}L} \qquad \text{Eq. v.4}$$

where $\mu$ = mobility and the other parameters are constants for a particular device.

This expression for $g_{SD}$ neglects the correction factors caused by variation of mobility with gate voltage. Substituting eq. V.3 in eq. V.2

$$\beta(v_g'-v_D)v_D R_L=v_{cc}-v_D \qquad \text{Eq. } v.5$$

$$v_D^2 R_L\beta-v_D(1+\beta v_g' R_L)+v_{cc}=0 \qquad \text{Eq. } v.6$$

Solving $$v_D=\frac{1+\beta v_g' R_L \pm [1+\beta^2 v_g'^2 R_L^2+2\beta_g' R_L-4\beta R_L v_{cc}]^{1/2}}{2\beta R_L}$$

$$=\frac{1}{2\beta R_L}+\frac{v_g'}{2}\pm\left[\frac{1}{4\beta^2 R_L^2}+\frac{v_g'^2}{4}+\frac{v_g'-2v_{cc}}{2R_L\beta}\right]^{1/2} \qquad \text{Eq. v. 7}$$

Stressing the device changes the mobility by $\beta\mu$ which results in a change $\Delta\beta$. This leads to a change of drain potential $\Delta v_D$. Differentiating eq. $v.7$ $$\frac{dv_D}{d\beta}=-\frac{1}{2R_L\beta^2}\pm\frac{-\frac{1}{4\beta^3 R_L^2}-\frac{v_g'-2v_{cc}}{4R_L\beta^2}}{\left[\frac{1}{4\beta^2 R_L^2}+\frac{v_g'^2}{4}+\frac{v_g'-2v_{cc}}{2R_L\beta}\right]^{1/2}} \qquad \text{Eq. v. 8}$$

for a given change $\Delta\beta$ we require the maximum signal output $\Delta v_D$; therefore, we must maximize $dv_D/d\beta$. In maximizing $dv_D/d\beta$ we must not allow a power dissipation in the device of greater than $w$ watts.

$$w=\frac{v_D v_{cc}}{R_L+\frac{1}{g_{sd}}} \qquad \text{Eq. v. 9}$$

A further constraint is that the drain voltage must not exceed the breakdown voltage of the device. For maximum power transfer to the next stage the output impedance of the transducer must match the output impedance ($R_{in}$) of the next stage $$R_{in}=\frac{1}{\frac{1}{R_L}+g_{sd}} \qquad \text{Eq. v. 10}$$

From these considerations it is found that a constant current source should be substituted for $R_L$ and that $R_{in}=1/g_{sd}$ and the power dissipation W be the maximum permissible. However there is very little loss in output if $R_L=1/g_{sd}$.

For a typical operation with $w=10^{-2}$ watts, $R_L=10^4$ ohms, $v_{cc}$=20 volts, $\beta=7\times10^{-5}$ a./volt$^2$, $$dv_D/d\beta=-3\times10^4 \text{ volt}^3/\text{a}.$$

i.e., for a 0.1 percent change in $\beta$ an output voltage ($dv_D$) of 22 mv. into a load of $10^4$ Ω is obtained. Increasing the maximum allowed power dissipation to $10^{-1}$ watts an output of 140 mv. into 500 Ω is obtained for the same change in $\beta$. The foregoing values are typical of those observed with the MOSFET microphone and phonopickup.

Figure 7:
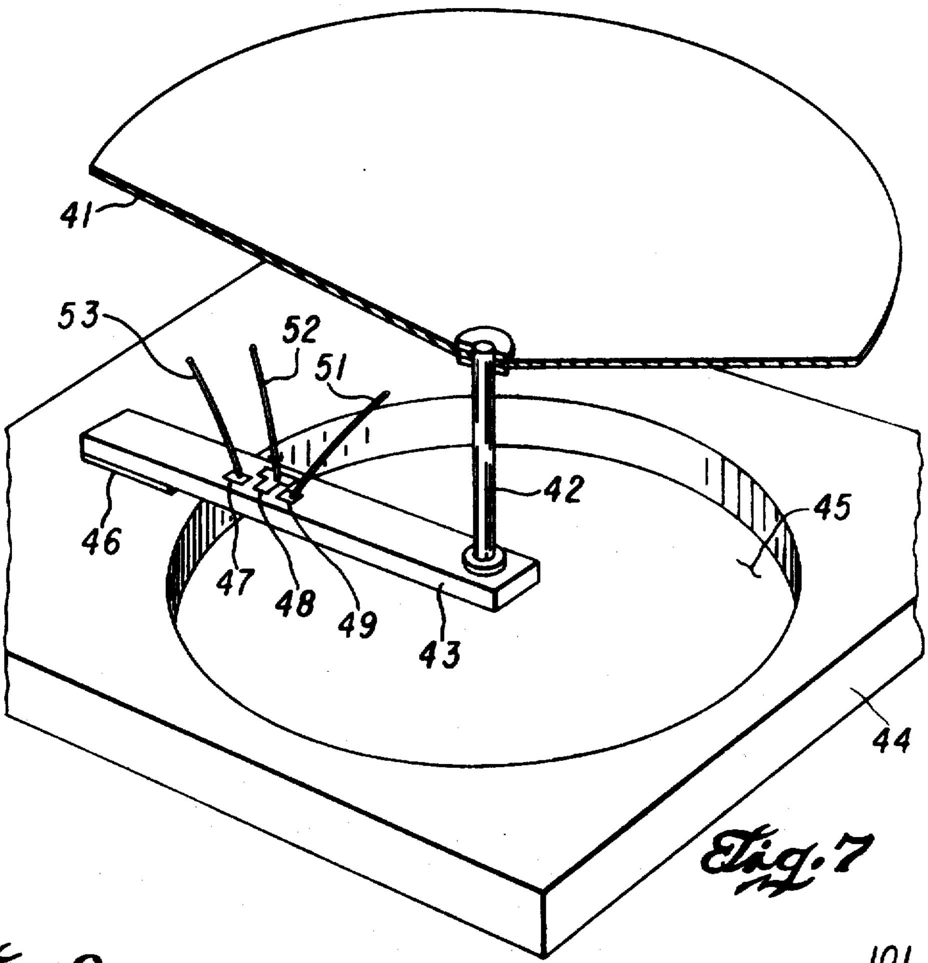
FIG. 7 is a simplified representation of a microphone pickup of this invention.

Several MOSFET microphones have been constructed as shown in FIG. 7. A silicon bar 43 is rigidly attached at 46 to support 44. A MOSFET device having source 47, gate 48 and drain 49 is formed on a silicon bar by any conventional technique. Lead wires 51, 52 and 53 are provided to connect the source to any desired preamplifier circuit (not shown). A diaphragm 41 is attached to the end of the cantilevered bar 43 by means of rod 42. Sound waves impinging on diaphragm 41 cause deflection of chip 43 into area 45 which deflection stresses and modulates the source-drain conductance of the MOSFET device, thereby providing the input to the preamplifier. The MOSFET devices which have been used in demonstrating feasibility of the microphone shown in FIG. 7 have channel width to length ratios of about 12. The impedance of the microphone in this case was nominally 3,000 ohms and the output voltage is 1–5 millivolts under normal speaking conditions; Nominal size of the MOSFET beams used in the display were 0.06 inches long × 0.010 inches wide × 0.004 inches thick. It should be noted that the particular embodiment of a microphone pickup is not intended as limiting upon applicants' invention, but is exemplary only, other ratios and dimensions being equally satisfactory in microphone pickups.

The foregoing considerations indicate that the transducer device might particularly serve the useful function as a microphone for a hearing aid device, and other devices where space is a problem. Since the technology for fabrication of the MOSFET microphone is compatible with that of fabrication of the MOS integrated circuit, the entire system could be rendered in integrated circuit form, thereby realizing the concept of the "integrated transducer-amplifier. "Such a system is shown in integrated form in FIG. 8 and in schematic in FIG. 9.

Referring to FIG. 9, and all MOSFET transducer-amplifier as shown having an output terminal 102 adapted to be connected to an output transducer, such as for example, a hearing aid speaker system. Transducer $T_1$, having source, drain and gate electrodes 104, 103 and 105, respectively, is shown as varying in response to sound vibrations received from a diaphragm which will be subsequently described in detail. MOSFET devices $T_2$, $T_3$, $T_4$, $T_6$ and $T_8$ have their terminals connected by electrical leads as shown so that the source and drain terminals thereof form passive load resistors for active amplifier MOSFET devices $T_1$, $T_5$, $T_7$ and $T_9$. $T_3$ and $T_4$, in addition to acting as load resistors for amplifier $T_5$, form a voltage divider network for positive feed back connected as shown from point 106 to gate electrode 105 of transducer $T_1$. Back-to-back diodes $D_1$ and $D_2$ are connected in a negative feedback circuit arrangement from output terminal 102 to the gate electrode of amplifier $T_5$ by its own electrical leas as shown. It should be noted that, for simplicity, reference numerals have been applied only to the gate, drain and source electrodes of $T_1$. The comparable electrodes for the remaining devices are symbolically shown in the same manner as the electrodes of $T_1$.

In the operation of the circuit shown in FIG. 9, a negative voltage $V_{DD}$ as applied to the input terminal 101 establishes a voltage differential between the source and drain terminals of each of the field effect devices. Assuming no stress is applied to $T_1$, the gate electrodes of transducer $T_1$ and amplifier stages $T_5$, $T_7$ and $T_9$ are biased so that the devices are all conducting. The negative feedback taken from the output terminal 102 is applied to bias gate terminal of $T_5$ to set the gate potential of $T_5$, $T_7$ and $T_9$ to produce the proper conduction thereof. Capacitor $C_1$ provides DC isolation of drain 103 of $T_1$ and the gate of $T_5$. At the same time, capacitor $C_1$ couples the output signal of the transducer $T_1$ to the gate of transistor $T_5$. $T_2$, $T_3$, $T_4$, $T_8$ and $T_8$ are load resistors in the conventional manner. Positive feedback to the gate of the transducer $T_1$ as taken at point 106 to provide additional gain of device $T_1$. The amount of gain is dependent upon the conductance ratio of $T_3$ to $T_4$. Deflection of the transducer $T_1$ in one direction, as will be discussed below with respect to FIG. 8, results in an increase in conductance of transistor $T_1$ which will cause the potential appearing at the gate of $T_5$ to move in a positive direction, thereby decreasing the source drain conductance of $T_5$, and causing the voltage of the gate of $T_7$ to go negative. The negative voltage appearing at the gate of $T_7$ increases the conductance of $T_7$, thereby causing the voltage appearing at the gate electrode of $T_9$ to move in a positive direction. The positive voltage appearing at the gate of $T_9$ decreases the conductance of $T_9$ and thereby causes the voltage appearing at the drain electrode and at terminal 102 to go negative. Should the transducer $T_1$ be deflected in the opposite direction, the voltage at the various amplifier stages would obviously move in the opposite direction so that the output at terminal 102 would move in a positive direction. It should be noted that no provisions are provided in FIG. 9 for adjusting the volume of the output, and is to be understood that such volume control could easily be installed in the output transducer system. It is also apparent that a conventional amplifier system may be utilized in conjunction with transducer $T_1$.

Figure 8:
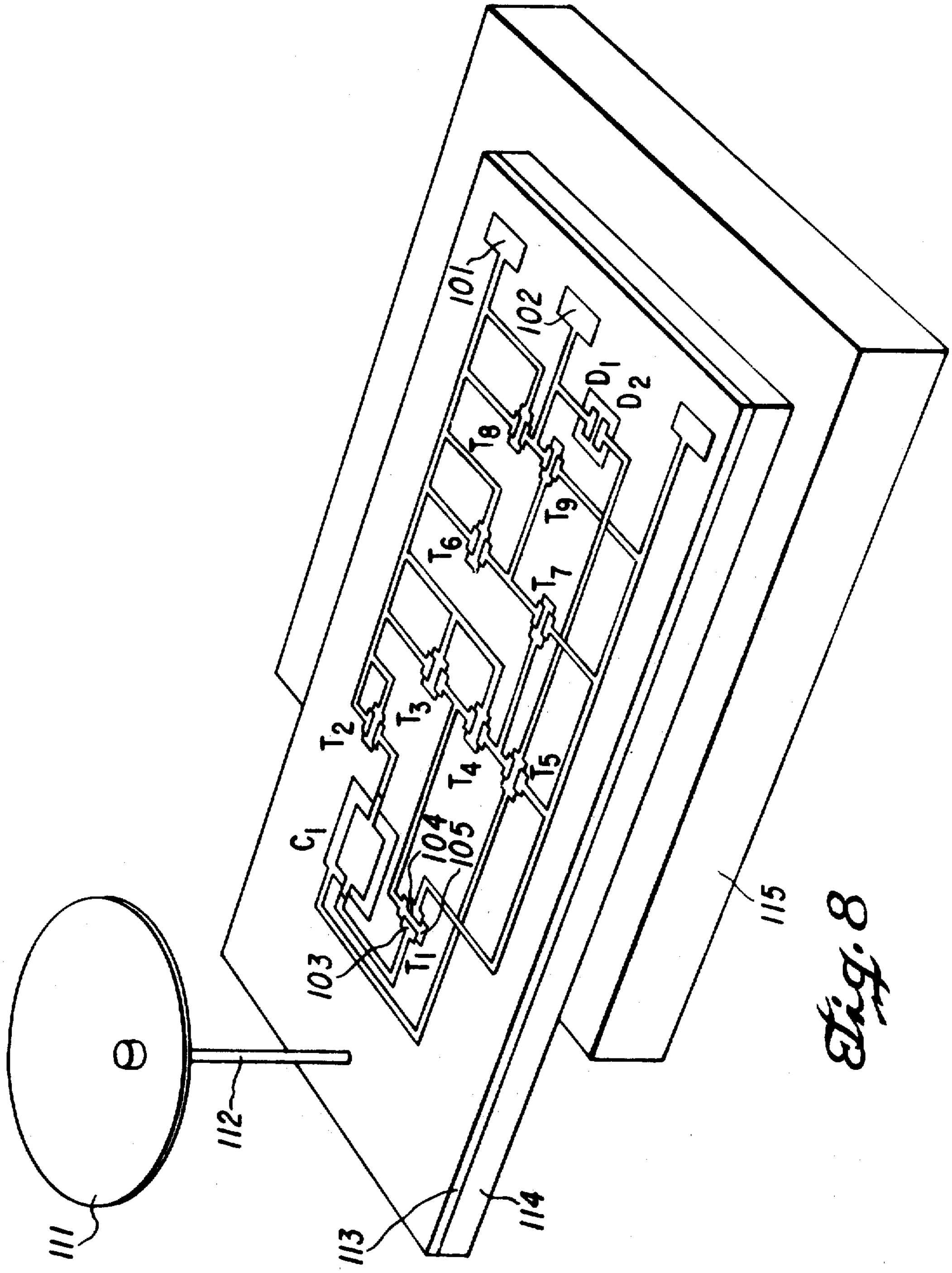
FIG. 8 is a partial representation of a microphone pickup and amplifier in integrated form.

FIG. 8 shows the circuit of FIG. 9 in integrated layout form to provide a fully integrated MOSFET microphone and amplifier circuit. In FIG. 8, like numerals are used to illustrate the circuit components of FIG. 9. A microphone diaphragm 111 is shown mechanically coupled by rod 112 to a silicon bar 113. Silicon bar 113 is mounted on any suitable insulating substrate material having a low Young's modulus to provide strength for the silicon bar and at the same time maintain high flexibility for the composite structure of the silicon bar and substrate material. One suitable substrate material is epoxy plastic. The silicon bar is attached to the plastic by any suitable adhesive. In many cases as in the case of epoxy, the plastic itself is adhesive. The composite structure is rigidly mounted to mounting base 115 in cantilever fashion as shown. The portion of the silicon bar containing transducer $T_1$ is extended over the edge of the mounting base. The remainder of the circuit of FIG. 9 is shown in integrated form on the silicon bar. It is seen that air vibrations will be picked up by the microphone diaphragm 111, which vibrations in turn will cause the portion of the silicon extending over the edge of the mounting base 115 to deflect. The deflection modulates the source to drain conductance of transducer $T_1$ as previously described to provide a signal which is amplified by a suitable amplifier circuit and supplied to a suitable transducer receiving system. It should be noted that although a flexible insulating base 114 is illustrated for the silicon chip, such base is not essential to the invention. A silicon bar may be mounted directly on the mounting base. The composite structure is preferred, however, to obtain maximum flexibility of the cantilever and to therefore obtain maximum sensitivity in the transducer $T_1$.

FIG. 13 illustrates a microphone amplifier arrangement in integrated layout form similar to FIGS. 8 and 9 which is designed to increase the sensitivity of transistor $T_1$. For simplicity, the integrated circuit leads connecting the elements of circuit of FIG. 9 are not shown. The connections would be as shown in FIGS. 8 and 9. In FIG. 13, the same reference numerals are used as in FIGS. 8 and 9 wherever applicable. As shown in FIG. 13, the composite body formed by a silicon bar 113 and 114 is formed generally in a T shaped arrangement. A first end portion cross member of the T is designated generally at 117, and the stem of the T is shown generally at 116, which stem comprises a second end portion to which rod 112 is attached, and an intermediate portion between the first and second end portions on which the transducer $T_1$ is mounted. The transducer $T_1$ is mounted on the stem or reduced section of the T to provide greater flexibility and higher sensitivity of the transducer. The remainder of the circuit is mounted on the cross member of the T since this area must be sufficiently large to accommodate all of the elements of the amplifier circuit.

FIG. 10 demonstrates the applicability of a MOSFET transducer as a phono-pickup. In the construction shown in FIG. 10, a standard $2\times10^{-2}$-cm.-thick silicon slice 11 with a MOSFET 12 fabricated by conventional techniques on one face was cut to the dimensions 1 cm. by 0.5 cm. Other dimensions could obviously be used for varied applications. The bar 11 is cemented at one end to a rigid block 18 and at the other end to a phonograph needle 31. In tracking a record groove, the needle causes the silicon slice to bend and hence modulates the MOSFET source to drain conductance. The dimensions of the silicon were calculated so that the maximum groove amplitude of $5\times10^{-3}$ cm. caused as 1 percent change of conductance. No attempt was made to optimize the compliance of the system or to reduce needle mass for good high-frequency tracking. The output power is limited only by the DC power dissipated in the device. The MOSFET pickup is an amplitude sensitive device in contrast to other types of pickup and will therefore operate down to DC and does not require bass boost.

A high-fidelity stereo cartridge is shown in FIG. 11*a* using the same principles as used in the design of the microphone. Two cantilever beams 13 and 14 of silicon or other piezoresistive material each have a metal insulator piezoresistive semiconductor channel layer device formed thereon. The beams are attached at one end to support 19. For convenience, a device 17 is shown schematically only on beam 13, the device on beam 14 being hidden. In order to separate the two stereo channels, a force resolver yoke is used as shown at 16. Note that the yoke 16 holds beams 13 and 14 so that the surfaces of the beams in which the MOSFET devices are formed are at right angles to one another. At the same time, it is convenient to gain a 10 to 1 mechanical advantage to reduce mass reflected at the needle. The two cantilevers 13 and 14 are deflected by the yoke through one-tenth the deflection of the needle 15 which is attached to yoke 16. As an example of design, if a needle compliance of $20\times10^{-6}$ cm./dyne is required, the cantilever compliance must be $2\times10^{-6}$ cm./dyne. If we require a 0.1 percent modulation of device conductance due to a $2.5\times10^{-3}$ cm. (1 mil) deflection of the needle, (which is the maximum groove amplitude) then the surface stress must be $4\times10^{7}$ dynes/cm.$^2$. From the equations given above we find each cantilever should be $3\times10^{-1}$ cm. long, $10^{-2}$ cm. thick and $2\times10^{-2}$ cm. wide.

FIG. 11*b* illustrates an alternate form for a high fidelity stereo cartridge utilizing MOSFET devices 32 formed thereon. A rectangularly shaped bar 33 of piezoresistive semiconductor material is attached in cantilever fashion to a support 34. The transducer devices 32 are mounted on surfaces which are at right angles to one another. Needle 35 is mounted on an edge of the rectangle adjacent to a surface containing one of the devices 32, but not to the other. It is obvious that the entire amplifier circuit for each channel may be placed in integrated form on the respective surfaces 32. For example, each surface may contain an integrated circuit as illustrated in FIG. 8.

FIG. 14 indicates a preferred embodiment of a stereo cartridge. The cartridge is generally similar to the cartridge illustrated in FIG. 11*a*. Two silicon bars, illustrated generally at 202 and 203, respectively, are formed similar to the T-shaped structure illustrated in FIG. 13. The silicon bar may be a composite structure in which the silicon is mounted on an insulating substrate as shown in FIG. 13, or the silicon bar may be mounted directly to a support and heat sink 204, the surfaces on which the bars are mounted lying in perpendicular planes. Note that the crossmember of the T-shaped member is mounted to the heat sink and the stem member of the T extends over the edge of the heat sink. In the example shown, the silicon bar is mounted directly on the heat sink. Transducer devices 205 are mounted on the stem of the T of both bars 203 and 202, the device being shown only on bar 205. Yoke 201 provides a mechanical connection between needle 206 and the silicon bars, the silicon bars being such that the surfaces on which the transducers 205 are mounted are at right angles to one another. In a structure of this type, the transducer-amplifier may be fully integrated, the amplifier being located on the crossmember of the T as in FIG. 13. By utilizing a structure of this type, an efficient transfer of heat is obtained from the amplifier to the heat sink 204. For simplicity, the integrated form of the amplifier is not shown on the crossmember of the T, it being understood that the integrated form would be similar to that as shown in FIG. 8.

It should be understood that in all cases in the foregoing description where reference is made to an insulated gate piezoresistive semiconductor field effect device, the preferred form of the device is a metal oxide piezoresistive semiconductor field effect device since the metal oxide devices are readily adopted to integrated circuit techniques. However, any known insulated gate piezoresistive semiconductor field effect device is within the scope of this invention.

While only preferred embodiments of the invention have been shown and described, it will be understood that various modifications of the embodiments may be made by those skilled in the art without departing from the spirit of the invention. It is the intention therefore, to be limited only as indicated by the scope of the following claims.

What is claimed is:

1. An integrated circuit transducer-amplifier system, comprising in combination:

a. a support member;

b. a flexible support substrate having one of its ends connected to said support member and its other end free to move with respect to said one end, said support substrate having a piezoresistive semiconductor region formed on one surface intermediate the ends thereof;

c. an insulated gate piezoresistive semiconductor field effect device formed in said semiconductor region, said insulated gate device being coupled between a voltage source and a reference potential for providing a predetermined voltage differential between its source and drain electrodes to produce a preselected source-drain conductance of said insulated gate device;

d. a plurality of metal insulator semiconductor field effect devices formed in said semiconductor region, said metal insulator devices being series connected between said voltage source and said reference potential, with the gate of one of said metal insulator devices being coupled to the output of said insulated gate device, and with the output of said one metal insulator device being coupled to the output of said transducer-amplifier; and e. mechanical means connected to said support substrate for imparting a uniaxial stress upon said support substrate so as to produce a corresponding stress upon said semiconductor region and thereby proportionally modulating the source-drain conductance of said insulated gate device.

2. The integrated circuit transducer-amplifier system of claim 1 wherein said piezoresistive semiconductor region is a layer of semiconductor material substantially overlying and secured to one major surface of said support substrate, and wherein said support substrate is made of an insulating material.

3. The integrated circuit transducer-amplifier system of claim 1 wherein the drain of said insulated gate device is coupled to said voltage source by a metal insulator semiconductor field effect device, and the source of said insulated gate device is coupled to said reference potential.

4. The integrated circuit transducer-amplifier system of claim 1 wherein the junction of two of said metal insulator devices are coupled to the gate of said insulated gate device for providing positive feedback thereto.

5. The integrated circuit transducer-amplifier system of claim 1 wherein the gate of said one metal insulator device is coupled to the drain of said insulated gate device by a capacitor.

6. The integrated circuit transducer-amplifier system of claim 1 and further including a pair of metal insulator semiconductor field effect devices formed in said semiconductor region and being series connected between said voltage source and said reference potential, and wherein the output of said one metal insulator device is coupled to the output of said transducer-amplifier system by one of said pair of metal insulator devices.

7. The integrated circuit transducer-amplifier system of claim 1 and further including a pair of back-to-back semiconductor diodes formed in said semiconductor region and being series connected between the output of said transducer-amplifier system and the source of said insulated gate device for providing a negative feedback thereto.

8. The integrated circuit transducer-amplifier system of claim 1 wherein said mechanical means is a diaphragm connected to said support substrate remote from said one end thereof, said diaphragm responds to air vibrations.

9. The integrated circuit transducer-amplifier system of claim 1 wherein said mechanical means is a phonograph needle connected to said support substrate remote from said one end thereof.

10. The integrated circuit transducer-amplifier system of claim 1 wherein said support substrate is T-shaped with the cap of the T being connected to said support member and the stem of the T being free to move with respect to said cap of the T.

11. The integrated circuit transducer-amplifier system of claim 10 wherein said semiconductor region substantially overlies and is secured to one major surface of said T-shaped support substrate, and wherein said insulated gate device is formed in the semiconductor region overlying said stem of the T and said metal insulating devices are formed in the semiconductor region overlying said cap of the T.

* * * * *

UNITED STATES PATENT OFFICE

CERTIFICATE OF CORRECTION

Patent No. 3,624,315 Dated November 30, 1971

MAX E. BROCE, et al

It is certified that error appears in the above-identified patent and that said Letters Patent is hereby corrected as shown below:

--In the heading it should appear that the Assignee is Texas Instruments Incorporated, Dallas, Texas. --

Signed and sealed this 30th day of May 1972.

(SEAL)
Attest:

EDWARD M.FLETCHER,JR.
Attesting Officer

ROBERT GOTTSCHALK
Commissioner of Patents